(12) United States Patent
Yamamoto

(10) Patent No.: US 6,910,409 B2
(45) Date of Patent: Jun. 28, 2005

(54) OSCILLATING ACTUATOR

(75) Inventor: Futoshi Yamamoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/330,142

(22) Filed: Dec. 30, 2002

(65) Prior Publication Data

US 2004/0123733 A1 Jul. 1, 2004

(51) Int. Cl.⁷ .................................................. F01B 9/00
(52) U.S. Cl. ........................................ 92/136; 92/117 R
(58) Field of Search ............................... 92/136, 117 R, 92/117 A

(56) References Cited

U.S. PATENT DOCUMENTS

| | | | |
|---|---|---|---|
| 3,101,639 A | * | 8/1963 | Cederleaf ..................... 92/136 |
| 3,242,771 A | * | 3/1966 | Maier et al. .................. 92/136 |
| 4,872,360 A | * | 10/1989 | Lew et al. ................. 92/117 A |
| 6,003,431 A | | 12/1999 | Bertini .......................... 92/30 |

* cited by examiner

Primary Examiner—F. Daniewl Lopez
(74) Attorney, Agent, or Firm—Jacobson Holman PLLC

(57) ABSTRACT

A rack and pinion type oscillating actuator includes a pair of parallel sliding holes formed in a body, rack members having racks slidably fitted in the pair of sliding holes, respectively, an output shaft having a pinion engaged with the racks is rotatably supported by bearings arranged in the body, and an output shaft is rotated by reciprocating of the rack members on the basis of supplying and discharging of compressed air. An end member closing one opening in the sliding hole is arranged in the body, a piston extending in an axial direction from the end member within the sliding hole is inserted in a closed-end cylindrical hole provided in the rack member so as to be relatively displaced in an axial direction, and a fluid passage, in which one end portion communicating with a pipe port provided in the end member and another end communicating with the closed-end cylindrical hole is provided in the piston.

2 Claims, 10 Drawing Sheets

PRIOR ART

OSCILLATING ACTUATOR

BACKGROUND OF THE INVENTION

1. Field of the Invention

The present invention relates to a rack and pinion type oscillating actuator which converts a linear reciprocating motion into an oscillating motion via a rack and pinion.

2. Description of the Conventional Art

As shown in FIGS. 19 and 20, there has been known a rack and pinion type oscillating actuator 51 structured such that a pair of mutually parallel sliding holes 53 are formed in a body 52. Rack members 54 having racks 55 formed in parts of the outer peripheries thereof are slidably fitted in the pair of sliding holes 53, respectively. An output shaft 56 with an integrally formed pinion 57 engaging with the racks 55 is rotatably supported by ball bearings 58 arranged in the body 52, and the output shaft 56 is rotated by reciprocating of the rack member 54 on the basis of supplying and discharging of compressed air.

However, in accordance with this conventional oscillating actuator 51, since seal members 59 for sealing the compressed air are respectively attached to both end portions in the axial direction of the rack members 54 having the racks 55 formed in parts of the outer peripheries thereof, it is necessary to make an axial length of the rack member 54 longer than a length for a necessary number of teeth. Accordingly, there is a disadvantage that the whole of the actuator 51 is made in a large size. Since an air leakage is generated if the seal member 59 such as a packing or the like is interfered with a pinion chamber 60, it is necessary to secure a margin corresponding thereto in the axial length of the rack member 54.

Further, since each of the rack members 54 is formed in a solid columnar shape, and the columnar rack member 54 is manufactured by a high specific gravity material such as a steel or the like for the purpose of obtaining a desired strength, the weight of the rack member 54 is heavy, whereby there is a disadvantage that the weight of the whole of the actuator 51 is heavy. When the rack member 54 is heavy, it is necessary to make a working pressure for moving the rack member 54 large.

In the case of mounting this kind of oscillating actuator to a head portion of a robot or the like, it is particularly required to make the actuator in small size and light weight in view of a conveyable weight capacity of the robot and a tact time abbreviation. Accordingly, the rack and pinion type oscillating actuator which is heavier and larger than a vane type oscillating actuator tends to be avoided. On the other hand, it is pointed out that the vane type oscillating actuator has air leakage and unstableness in motion. Therefore, it is desired to make the rack and pinion type oscillating actuator small size and light weight.

Further, in this kind of oscillating actuator, there is a case that sliding abrasion powder (metal abrasion powder) generated when the rack member 54 slides within the sliding hole 53 deteriorates a lubricating fluid. In accordance with the conventional oscillating actuator 51, since the sliding surface of the seal member 59 overlaps with the sliding surface of the rack member 54, there is a case that the deteriorated lubricating fluid adversely influences a service life of the seal member 59.

SUMMARY OF THE INVENTION

The present invention is made by taking the points mentioned above into consideration, and an object of the present invention is to provide a rack and pinion type oscillating actuator which can be in a small size and a light weight in comparison with the conventional art mentioned above.

Further, another object of the present invention is to provide a rack and pinion type oscillating actuator which can improve a service life of a seal member.

In order to achieve the object mentioned above, in accordance with a first aspect of the present invention, there is provided a rack and pinion type oscillating actuator structured such that a pair of mutually parallel sliding holes are formed in a body, rack members having racks are slidably fitted in the pair of sliding holes, respectively, an output shaft having a pinion engaged with the racks is rotatably supported by bearings arranged in the body, and the output shaft is rotated by reciprocating of the rack members on the basis of supplying and discharging of compressed air, wherein an end member closing one of openings in the sliding hole is arranged in the body, a piston extending in an axial direction from the end member within the sliding hole is inserted to a closed-end cylindrical hole provided in the rack member so as to be relatively displaced in an axial direction, and a fluid passage, in which one end portion communicates with a pipe port provided in the end member and another end communicates with the closed-end cylindrical hole, is provided in the piston.

Further, in accordance with a second aspect of the present invention, there is provided an oscillating actuator as recited in the first aspect, wherein a gap in a diametrical direction between the piston and the closed-end cylindrical hole inner surface is formed larger than a gap in a diametrical direction between the rack member and the sliding hole inner surface.

In the oscillating actuator in accordance with the first aspect of the present invention provided with the structure mentioned above, since the closed-end cylindrical hole is formed in one end of the rack member having the rack, the piston integrally formed with the end member is inserted to the closed-end cylindrical hole so as to be capable of being freely displaced relatively, and the flow passage connecting the pipe port and the closed-end cylindrical hole is formed in the end member and the piston, the pressure chamber is formed within the inner portion of the closed-end cylindrical hole, that is the inner portion of the rack member, and the seal member si arranged in the inner portion of the rack member so as to seal the compressed air supplied to the compression chamber via the flow passage from the pipe port. Accordingly, since the seal member is arranged in the inner portion of the rack member while the rack is formed on the outer surface of the rack member, it is not necessary to arrange the rack and the seal member in series in the axial direction, whereby it is possible to shorten the axial length of the rack member. It is sufficient that the axial length of the rack member can secure the necessary number of teeth of the rack. Further, in accordance with the actuator of the structure mentioned above, since the closed-end cylindrical hole is formed in the rack member and the rack member is formed in the hollow shape, it is possible to reduce the weight of the rack member.

Further, since the sliding surface of the seal member does not overlap with the sliding surface of the rack member in accordance with the structure mentioned above, it is possible to previously prevent the seal member from being affected by the sliding abrasion powder generated by the sliding of the rack member.

In addition, in the oscillating actuator in accordance with the second aspect of the present invention provided with the structure mentioned above, since the gap in the diametrical direction between the piston and the inner surface of the closed-end cylindrical hole is formed larger than the gap in the diametrical direction between the rack member and the inner surface of the sliding hole, the rack member linearly reciprocating on the basis of the supplying and discharging of the compressed air is guided by and reciprocated along the inner surface of the sliding hole in the outer peripheral side of the rack member, and then the rack member reciprocates without sliding against the piston in the inner peripheral side of the rack member. Accordingly, it is possible to prevent the sliding abrasion powder from being generated by the sliding of the rack member against the piston. Further, it is possible to inhibit a reaction force generated when the rack transmits a force to the pinion from being applied to the piston, and it is possible to inhibit the rack member from galling between the inner surface of the sliding hole and the piston.

In the actuator in accordance with the first aspect or the second aspect mentioned above, this piston can be called as a convex portion, since the piston corresponding to one of the constituting elements is provided in the end member and fixed to the body via the end member, and the closed-end cylindrical hole can be called as a hollow portion provided so as to be open to one end surface of the rack member. Accordingly, in this case, the first aspect and the second aspect can be described as follows.

First Aspect:

A rack and pinion type oscillating actuator structured such that a pair of mutually parallel sliding holes are formed in a body, rack members having racks are slidably fitted in the pair of sliding holes, respectively, an output shaft having a pinion engaged with the racks is rotatably supported by bearings arranged in the body, and the output shaft is rotated by reciprocating of the rack members on the basis of supplying and discharging of compressed air, wherein an end member closing one of openings in the sliding hole is arranged in the body, a convex portion extending in an axial direction from the end member within the sliding hole is inserted to a hollow portion provided so as to open to one end surface of the rack member in such a manner as to be relatively displaced in an axial direction, and a fluid passage, in which one end portion communicates with a pipe port provided in the end member and another end communicates with the hollow portion, is provided in the convex portion.

Second Aspect:

An oscillating actuator as recited in the first aspect, wherein a gap in a diametrical direction between the convex portion and the inner surface of the hollow portion is formed larger than a gap in a diametrical direction between the rack member and the sliding hole inner surface.

Further, in view of the objects mentioned above, the present proposal is to provide a rack and pinion type oscillating actuator comprising: a rack member which is slidably inserted into a sliding hole of a body, is moved by supplying compressed air, and is provided with a rack engaged with a pinion of an oscillating member; and an end member closing an opening portion of the sliding hole, wherein a hollow portion open to one end surface is provided in the rack member, a convex portion slidably inserted into the hollow portion is provided in the end member, a seal member slidably in close contact with one of an outer surface of the convex portion and an inner surface of the hollow portion is provided in another thereof, and a flow passage is open to a leading end of the convex portion so as to supply compressed air to the hollow portion from the flow passage. Further, there is provided a rack and pinion type oscillating actuator structured such that a pair of mutually parallel sliding holes are formed in a body, rack members having racks in parts of respective outer peripheries of the sliding holes are slidably fitted in the pair of sliding holes, respectively, an output shaft in which a pinion engaged with the racks is integrally formed is rotatably supported by bearings arranged in the body, and the output shaft is rotated by reciprocating of the rack members on the basis of supplying and discharging of compressed air, wherein an end member closing one of openings in the sliding hole is arranged in an end surface of the body, a piston extending in an axial direction from the end member within the sliding hole is inserted to a closed-end cylindrical hole provided in the rack member in such a manner as to be relatively displaced in an axial direction, and a fluid passage in which one end portion communicates with a pipe port provided in the end member and another end communicates with the closed-end cylindrical hole is provided in the piston.

DESCRIPTION OF THE PREFERRED EMBODIMENTS

Next, a description will be given of embodiments in accordance with the present invention with reference to the accompanying drawings.

First Embodiment

Figure 1:
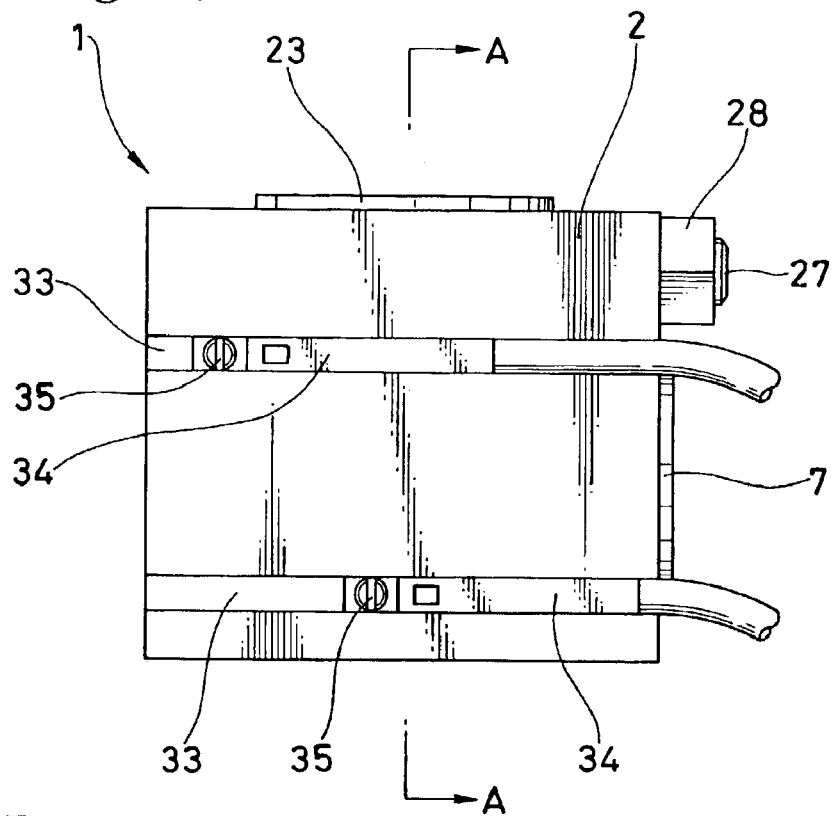
FIG. 1 is a front view of an oscillating actuator in accordance with a first embodiment of the present invention.
Figure 2:
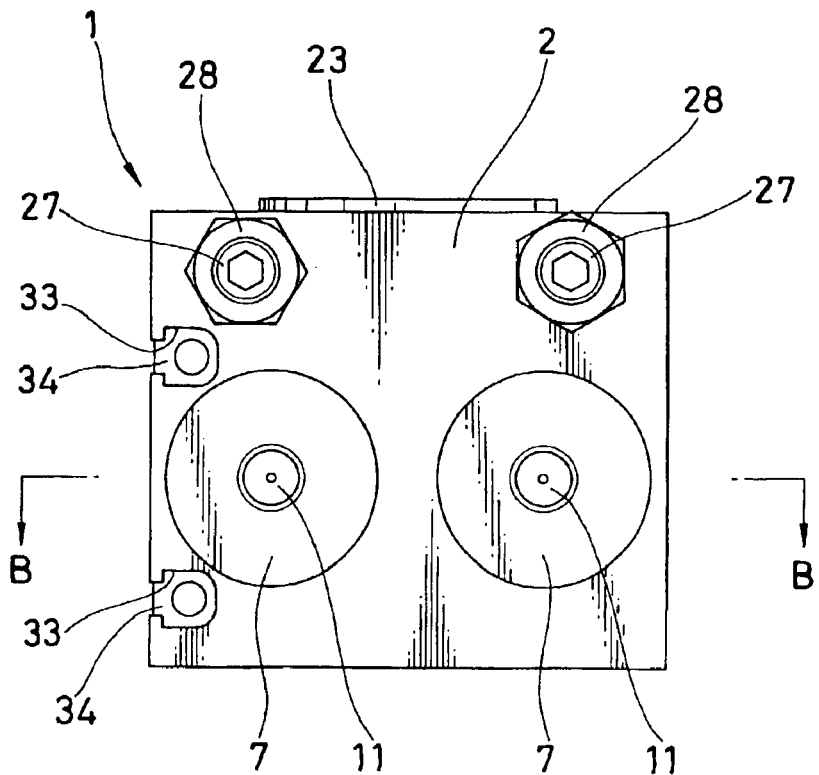
FIG. 2 is a right side view of the actuator.
Figure 3:
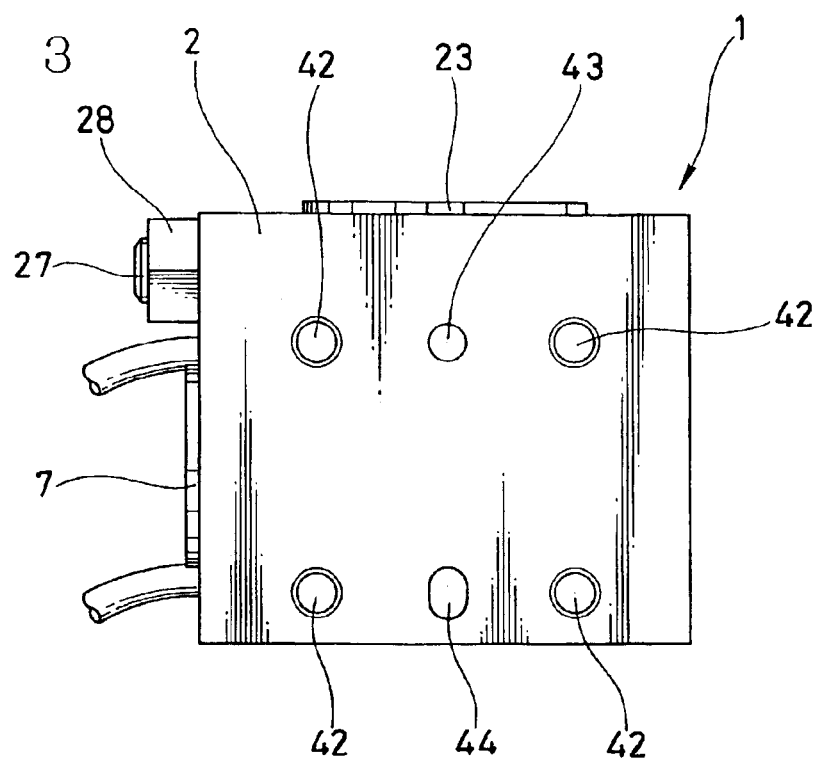
FIG. 3 is a back view of the actuator.
Figure 4:
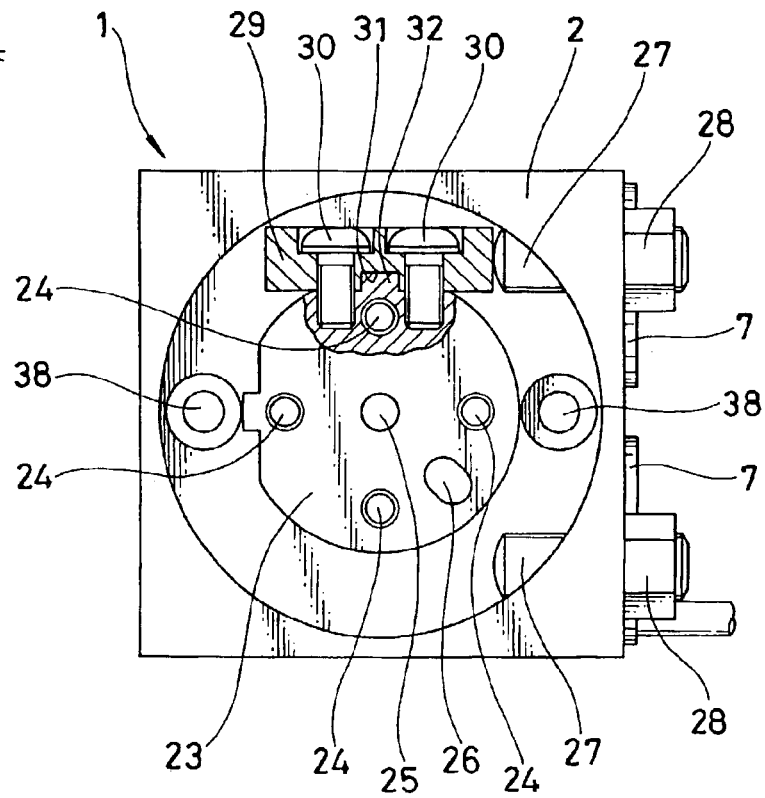
FIG. 4 is a partly notched plan view of the actuator.
Figure 5:
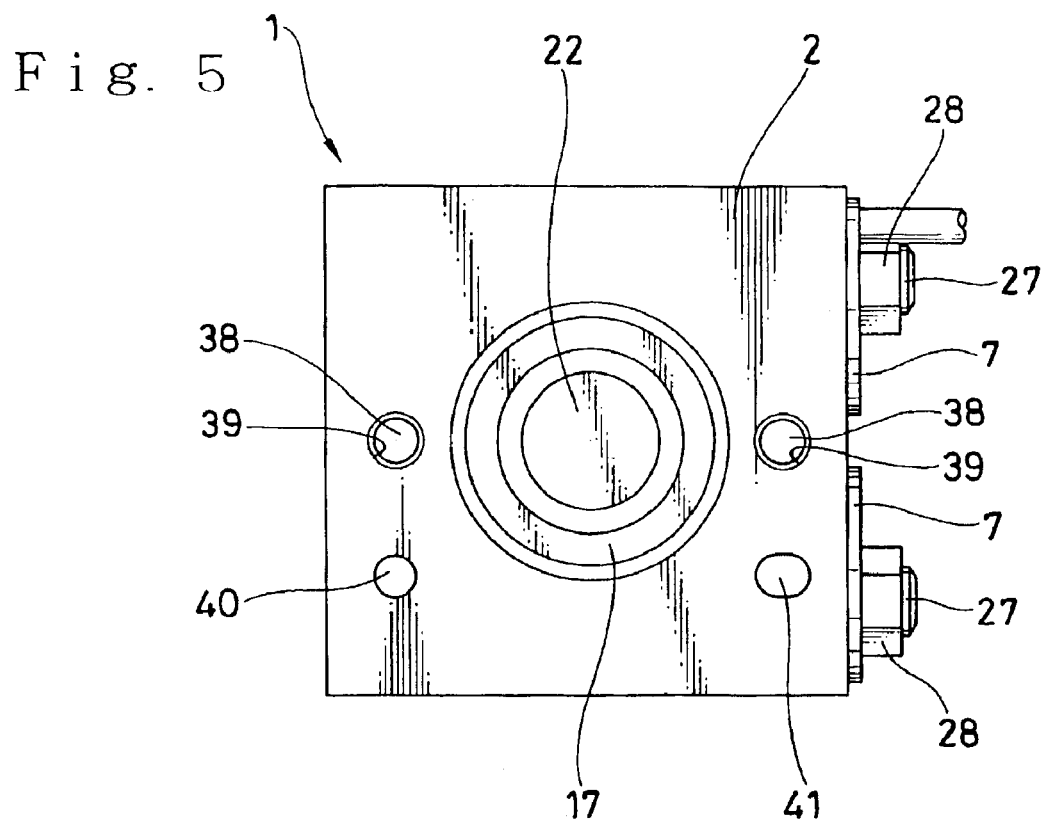
FIG. 5 is a bottom view of the actuator.
Figure 6:
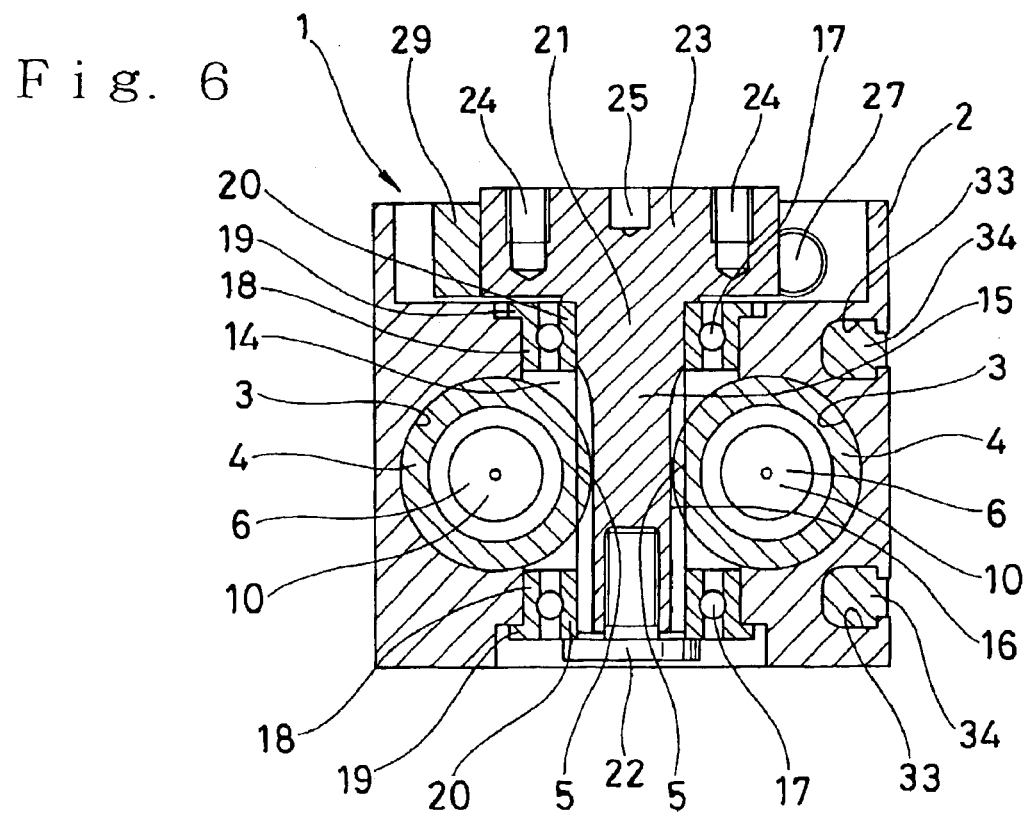
FIG. 6 is a cross sectional view along a line A—A in FIG. 1.
Figure 7:
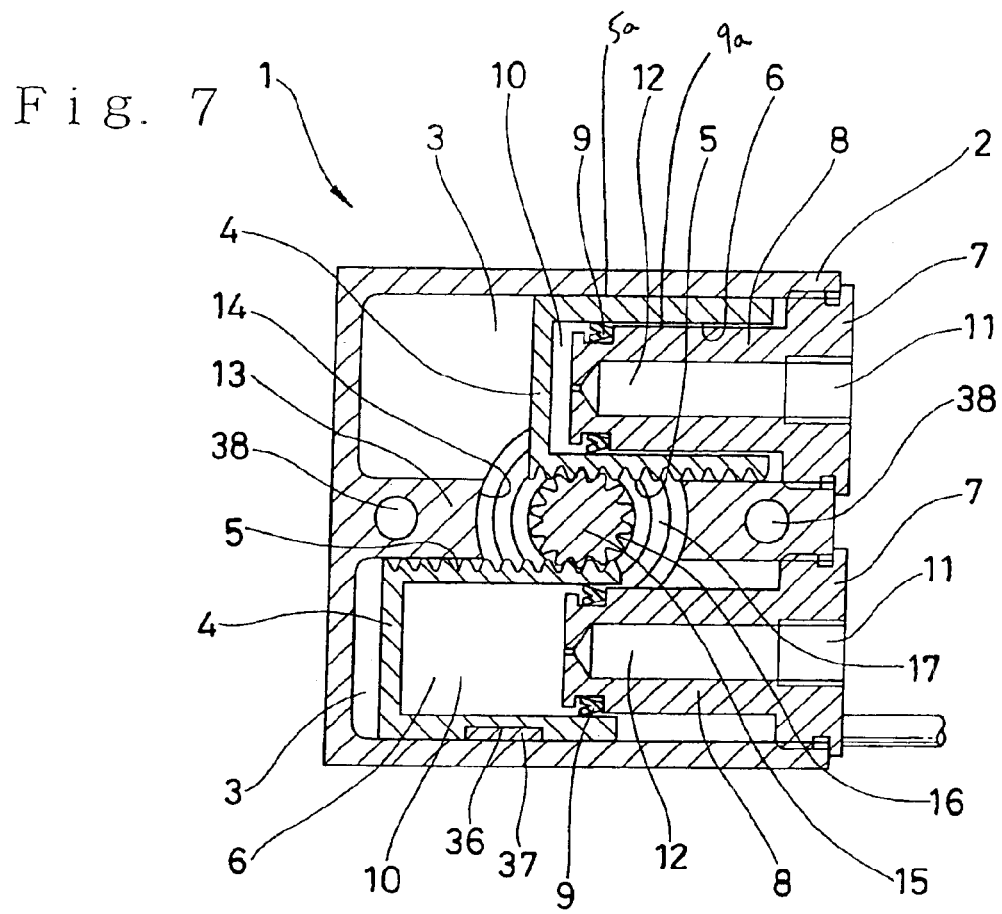
FIG. 7 is a cross sectional view along a line B—B in FIG. 2.
Figure 8:
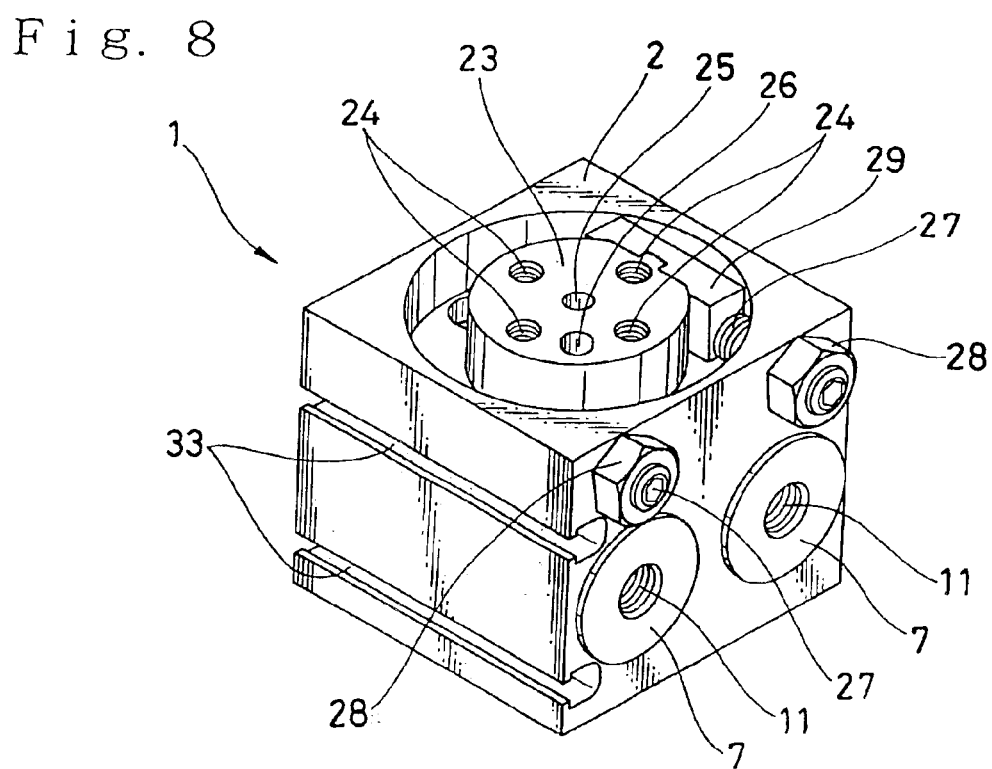
FIG. 8 is a perspective view of the actuator.

FIG. 1 is a front view of a rack and pinion type oscillating actuator 1 in accordance with a first embodiment of the present invention, FIG. 2 is a right side view, FIG. 3 is a back view, FIG. 4 is a partly notched plan view, and FIG. 5 is a bottom view. Further, FIG. 6 is a cross sectional view along a line A—A in FIG. 1, FIG. 7 is a cross sectional view along a line B—B in FIG. 2, and FIG. 8 is a perspective view, respectively.

In an actuator 1 in accordance with the present embodiment, first, a pair of sliding holes 3 are formed in parallel in an inner portion of a substantially box-shaped body 2, and rack members 4 are fitted in the pair of sliding holes 3 in such a manner as to freely slide in an axial direction. A rack 5 is formed in a part of an outer peripheral surface in each of the rack members 4 along an axial direction thereof, and a closed-end cylindrical hole (a hollow portion) 6 extending in an axial direction from one end surface is formed therein.

An end member 7 is screwed into one opening of each of the pair of sliding holes 3. A piston (a convex portion) 8 protruding in an axial direction within the sliding hole 3 is integrally formed in the end member 7, the piston 8 is inserted to the closed-end cylindrical hole 6 of the rack member 4 in such a manner as to be relatively displaced, and air tightness is kept by a ring-shaped seal member 9 attached to a leading end portion of the piston 8, whereby a pressure chamber 10 is formed in an inner portion of the closed-end cylindrical hole 6. The seal member 9 is fitted to an outer periphery of the piston 8, and is slidably in close contact with an inner peripheral surface of the closed-end cylindrical hole 6. A pipe port 11 is formed in an end surface of the end member 7, and communicates with a flow passage 12 extending through in an axial direction, and compressed air is supplied to and discharged from the pressure chamber 10 via the pipe port 11 and the flow passage 12.

A gap 9a in a diametrical direction between the piston 8 and the inner surface of the closed-end cylindrical hole 6 is formed larger than a gap 5a in a diametrical direction between the rack member 4 and the inner surface of the sliding hole 3.

A housing hole 14 for ball bearings 17 extending through in a vertical direction in the center of a wall portion 13 between the pair of sliding holes 3 is formed in the body 2 so as to communicate with the sliding holes 3, and outer races 18 of the ball bearings 17 rotatably supporting an output shaft 15 having an integrally formed pinion 16 are fitted to upper and lower positions in the bearing hole 14, respectively.

Each of a pair of upper and lower ball bearings 17 has an engagement portion 19 protruding outward in a diametrical direction from the outer race 18, and is engaged with an end surface of the body 2 by this engagement portion 19. Further, an inner race 20 of the ball bearing 17 is clamped by an expanded portion 21 formed in an upper end of the output shaft 15, and a set screw 22 screwed into a lower end of the output shaft 15. Accordingly, since a gap in an axial direction can be eliminated by screwing the set screw 22, the output shaft 15 does not rattle in the axial direction. In accordance with this structure, since the ball bearings 17 are arranged on the basis of a back surface mounting, a distance between working points of load is large, and accordingly it is possible to support a comparatively large moment. Further, it is possible to make a rigidity high by applying a desired preload. The ball bearing 17 provided with the engagement portion 19 in the outer race 18 is available in the market, and it is not necessary to form a seat surface engaging with the ball bearing 17 in the housing hole 14 at a time of arranging the ball bearing 17 on the basis of the back surface mounting by using this kind of available ball bearing 17. Accordingly, it is possible to form the housing hole 14 straight. Therefore, no center shift in a pair of upper and lower ball bearings 17 is generated, and it is possible to improve rotational accuracy of the output shaft 15 with respect to the body 2. Further, due to easy working, it is possible to limit manufacturing cost to a low level.

The pinion 16 formed on an outer peripheral surface of the output shaft 15 is engaged with the rack 5 of the rack member 4, whereby a linear reciprocating motion of the rack member 4 is converted into an oscillating motion of the output shaft 15.

A table 23 is provided on an upper surface of an expanded portion 21 in the output shaft 15. A plurality of female screws 24 are formed on an upper surface of the table 23, and a work or a tool or the like is mounted on the table 23 by using the female screws 24. Further, a round hole 25 and a long hole 26 for fitting a positioning pin are formed on the upper surface of the table 23 with high accuracy, and mounting repeatability of the work or the tool or the like can be secured thereby. In this case, the structure may be made such that the expanded portion 21 is extended outside the body 2 in place of the table 23, and is connected to another member by a split fastening or the like.

A pair of adjusting bolts 27 are screwed into the body 2 so as to freely move forward and backward in parallel to the sliding hole 3, and are respectively fixed by nut members 28. Since the adjusting bolts 27 are provided on the same surface in the body 2 together with a pipe port 11, operability is good.

A stopper member 29 which is brought into contact with a leading end portion of the adjusting bolt 27 at both oscillating ends thereof is fixed to the side surface of the table 23 by bolt members 30. Since a recess portion 31 is formed in the stopper member 29, and the recess portion 31 is fitted to a convex portion formed in the table 23, no play, no shift or the like is generated even when a comparatively large force is applied to the stopper member 29.

As mentioned above, since the ball bearing 17 is arranged on the basis of the back surface mounting, the expanded portion 21 and the table 23 can be integrally formed with the output shaft 15. Accordingly, since an eccentricity and an incline between the table 23 and the output shaft 15 are determined only by working accuracy, it is possible to improve rotational accuracy of the table 23 with respect to the body 2. Further, since no connection portion exists between the table 23 and the output shaft 15, it is possible to make the actuator 1 in small size and light weight at that degree, and it is possible to limit a manufacturing cost to a low level.

A plurality of sensor mounting grooves 33 are formed on an outer front surface of the body 2 in parallel to the sliding hole 3, and position detecting sensors 34 are respectively mounted to the sensor mounting grooves 33. The position detecting sensor 34 is fixed by a fixing device 35 so as to be movable to a desired position within the sensor mounting groove 33. A key groove-shaped long groove 36 is formed in a part of an outer periphery in the rack member 4, and a rectangular column-shaped permanent magnet 37 is arranged in this long groove 36. The position detecting sensor 34 outputs a signal on the basis of an approach of the permanent magnet 37, and transmits the signal to a desired portion.

A plurality of mounting holes 38 extending through from the upper surface to the bottom surface of the body 2 are provided in the body 2, and a plurality of female screws 39 are formed in the bottom surface so as to be coaxial with the mounting holes 38. Further, a round hole 40 and a long hole 41 for fitting positioning pins are formed on the bottom surface with high accuracy, whereby mounting repeatability of the body 2 is secured. Further, a plurality of female screws 42, a round hole 43 and a long hole 44 are formed on the back surface in the same manner with high accuracy, and a mounting repeatability of the body 2 is secured.

As a means for mounting the body 2 to a head of a robot, a stand of an equipment or the like, it is possible to select the mounting hole 38 and the female screws 39 and 42. Further, since three surfaces of the body 2 can be selected as a mounting surface, a mounting freedom is increased.

Next, an operation of the actuator 1 having the structure mentioned above is as follows.

That is, when supplying compressed air corresponding to a working fluid to one pressure chamber 10 from a compressed air supply source and a switching valve which are not illustrated via one pipe port 11 and the flow passage 12, and opening another pressure chamber 10 to the atmospheric air via another flow passage 12, the pipe port 11 and the switching valve, one rack member 4 is pressed by the compressed air and starts forward moving, and the output shaft 15 oscillates in one rotational direction in accordance with the movement of one rack member 4. Further, another rack member 4 moves backward in accordance with the rotation of the output shaft 15. When the table 23 rotates in correspondence with the rotation of the output shaft 15, and the stopper member 29 provided in the table 23 is brought into contact with the leading end portion of one adjusting bolt 27, the oscillation finishes. It is possible to adjust an angle of oscillation of the table 23 by adjusting a protruding amount of the adjusting bolt 27. In the oscillation end, one position detecting sensor 34 fixed to the body 2 detects a magnetic field of the permanent magnet 37 and transmits the signal to a sequencer or the like.

Next, when switching the switching valve (not shown), supplying the compressed air corresponding to the working fluid to another pressure chamber 10 via another pipe port 11 and the flow passage 12, and opening one pressure chamber 10 to the atmospheric air via one flow passage 12, the pipe port 11 and the switching valve, another rack member 4 is pressed by the compressed air and starts forward moving, and the table 23 rotates in an opposite direction. Further, when the stopper member 29 is brought into contact with the leading end portion of another adjusting bolt 27, the oscillation finishes. It is possible to adjust the angle of oscillation of the table 23 by adjusting the protruding amount of the adjusting bolt 27. In the oscillation end, another position detecting sensor 34 fixed to the body 2 detects the magnetic field of the magnet and transmits the signal to the sequencer or the like.

In accordance with the actuator 1 having the structure mentioned above, it is possible to achieve the following operations and effects.

That is, first, since the rack 5 engaged with the pinion 16 of the output shaft 5 is formed on the outer peripheral surface of the rack member 4 as mentioned above, and the seal member 9 sealing the compressed air in the pressure chamber 10 is fitted to the outer periphery of the piston 8 inserted into the closed-end cylindrical hole 6 so as to be arranged in the inner side of the rack member 4, it is not necessary to arrange the rack 5 and the seal member 9 in series in the axial direction, and they are not actually arranged in series, in accordance with the actuator 1. Accordingly, it is possible to shorten the axial length of the rack member 4 in comparison with the conventional one. Therefore, it is possible to reduce the axial length of the body 2 in accordance therewith, and it is possible to make the whole of the actuator 1 in small size in the same direction. Further, since the closed-end cylindrical hole 6 is formed in the rack member 4 and the rack member 4 is formed in the hollow shape, it is possible to reduce the weight of the rack member 4 at this degree. Since the rack member 4 is formed by a high specific gravity material such as a steel or the like in order to obtain the desired strength, the weight is comparatively largely reduced. On the other hand, since the piston 8 is formed by a low specific gravity material such as an aluminum alloy or the like together with the end member 7, the increase of the weight caused by adding the piston 8 is comparatively small. Therefore, it is possible to totally reduce the weight of the actuator 1. In accordance with the matters mentioned above, it is possible to provide the oscillating actuator 1 which has a small size and a small weight.

Further, since the sliding surface of the seal member 9 does not overlap with the sliding surface of the rack member 4 in accordance with the structure mentioned above, it is possible to previously prevent the seal member 9 from being affected by the sliding abrasion powder generated by sliding of the rack member 4, whereby it is possible to improve a service life of the seal member 9.

Further, since the gap in the diametrical direction between the piston 8 and the inner surface of the closed-end cylindrical hole 6 is formed larger than the gap in the diametrical direction between the rack member 4 and the inner surface of the sliding hole 3, the rack member 4 linearly reciprocating on the basis of the supplying and discharging of the compressed air is guided by and reciprocated along the inner surface of the sliding hole 3 in the outer peripheral side thereof, and the rack member 4 reciprocates without sliding with the piston 8 in the inner peripheral side thereof. Accordingly, it is possible to prevent the sliding abrasion powder from being generated due to the sliding of the rack member 4 with the piston 8, whereby it is possible to maintain the lubrication achieved by the lubricating fluid within the closed-end cylindrical hole 6 in a good state. Further, it is possible to inhibit the reaction force generated when the rack 5 transmits the force to the pinion 16 from being applied to the piston 8, and it is possible to inhibit the rack member 4 from galling between the inner surface of the sliding hole 3 and the piston 8. Accordingly, it is possible to improve the service life of the seal member 9 on the basis of the above matters, and it is possible to smoothly operate the oscillating actuator 1.

Second Embodiment

Figure 9:
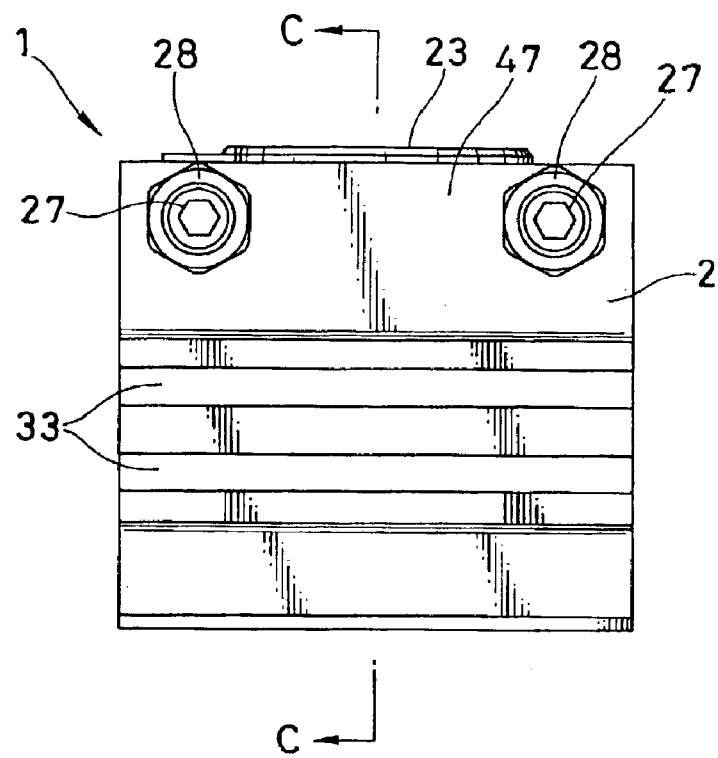
FIG. 9 is a front view of an oscillating actuator in accordance with a second embodiment of the present invention.
Figure 10:
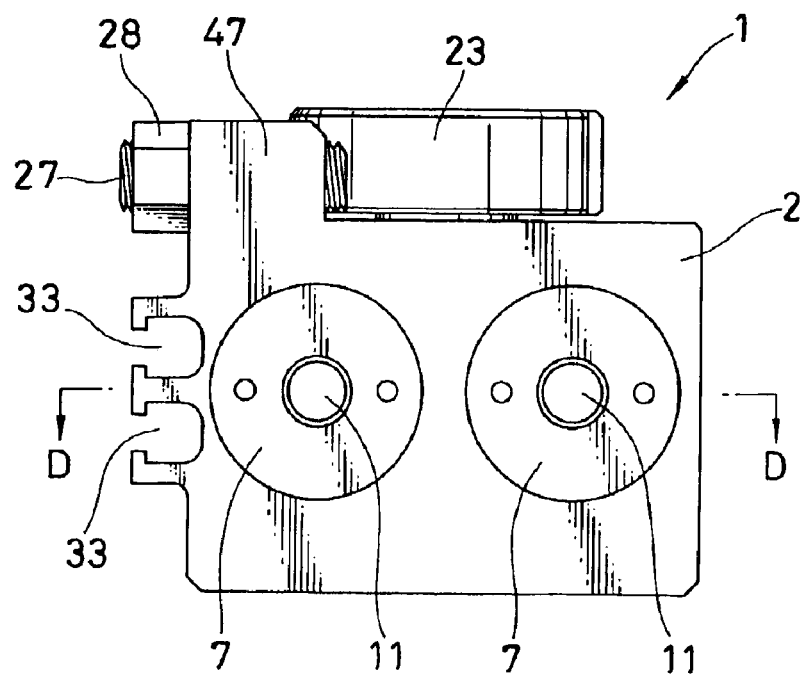
FIG. 10 is a right side view of the actuator.
Figure 11:
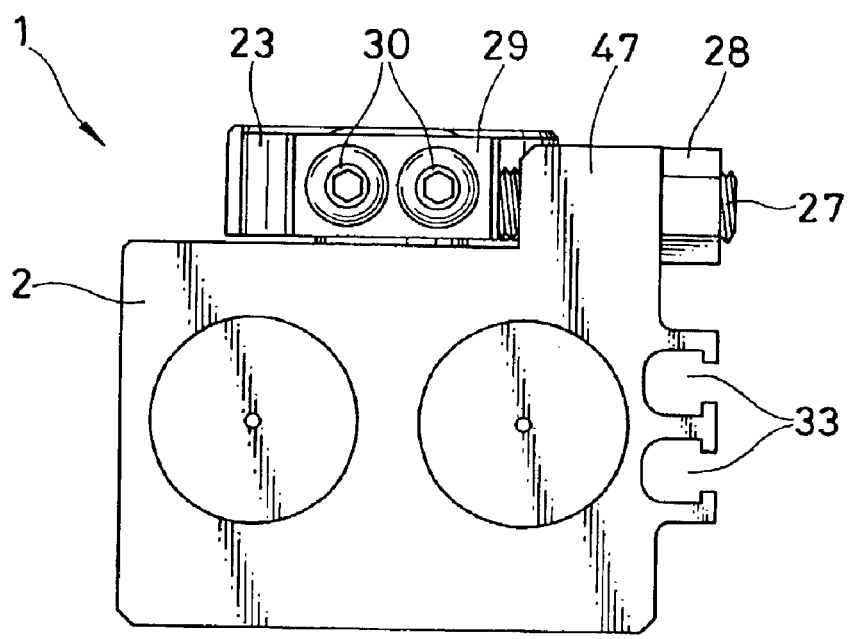
FIG. 11 is a left side view of the actuator.
Figure 12:
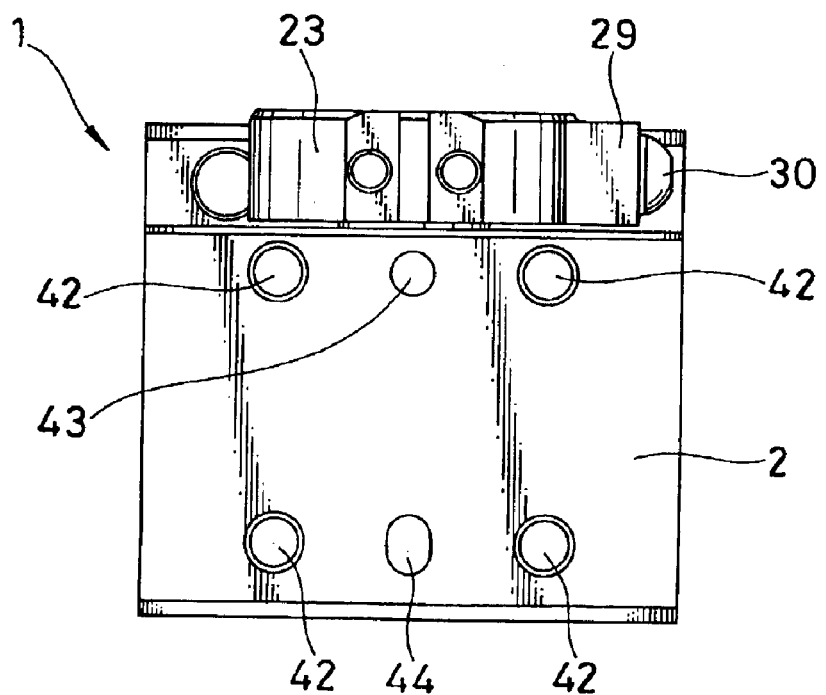
FIG. 12 is a back view of the actuator.
Figure 13:
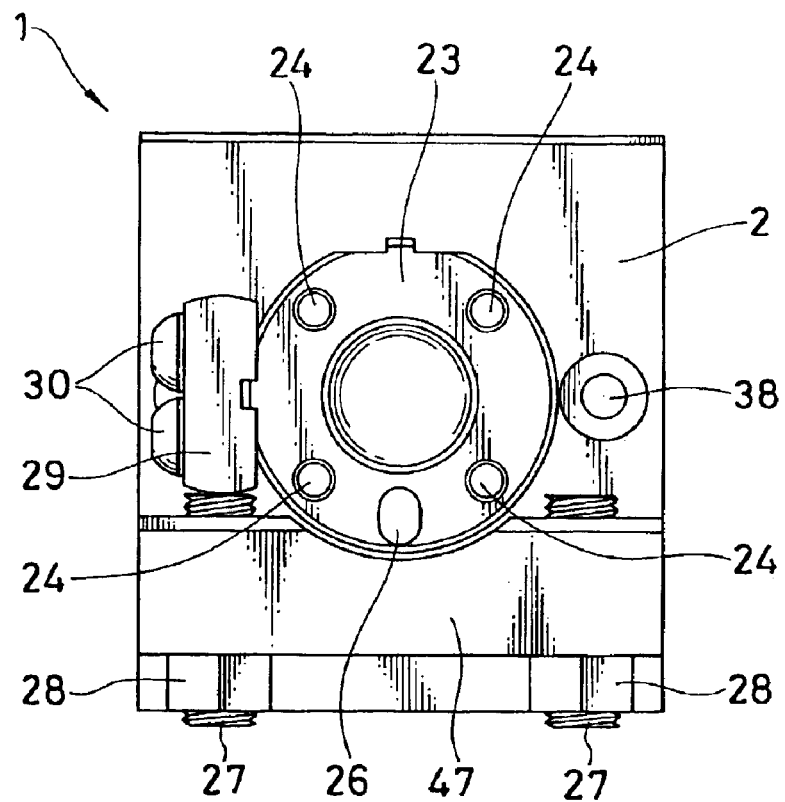
FIG. 13 is a plan view of the actuator.
Figure 14:
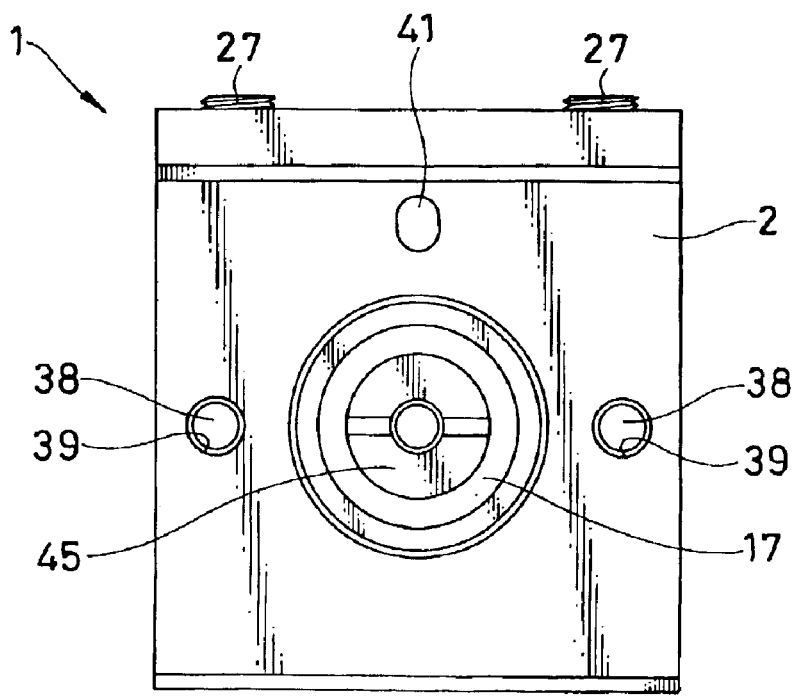
FIG. 14 is a bottom view of the actuator.
Figure 15:
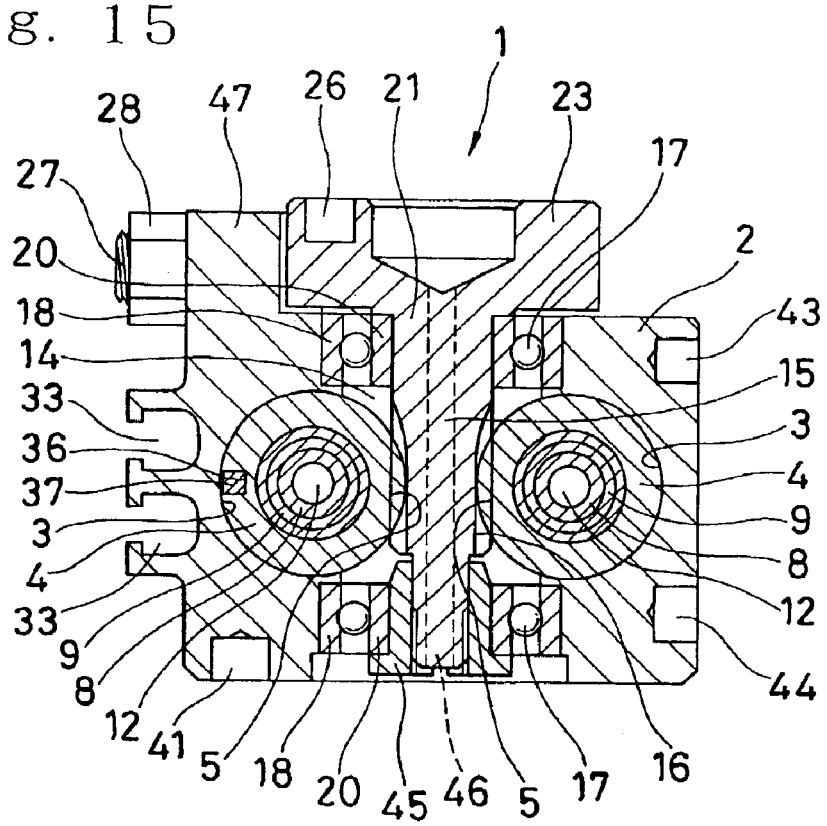
FIG. 15 is a cross sectional view along a line C—C in FIG. 9.
Figure 16:
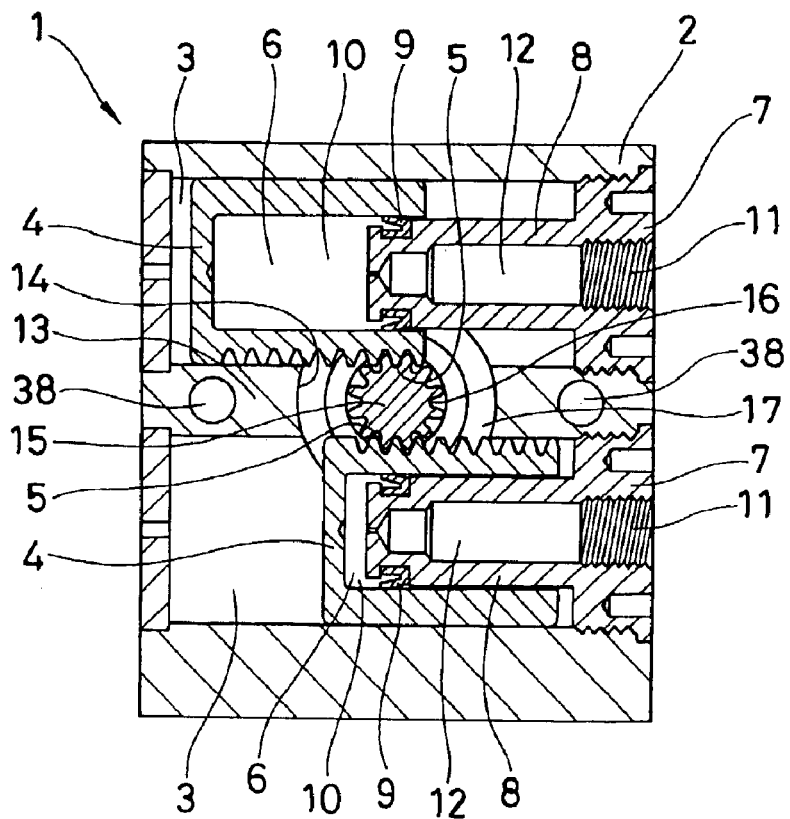
FIG. 16 is a cross sectional view along a line D—D in FIG. 10.
Figure 17:
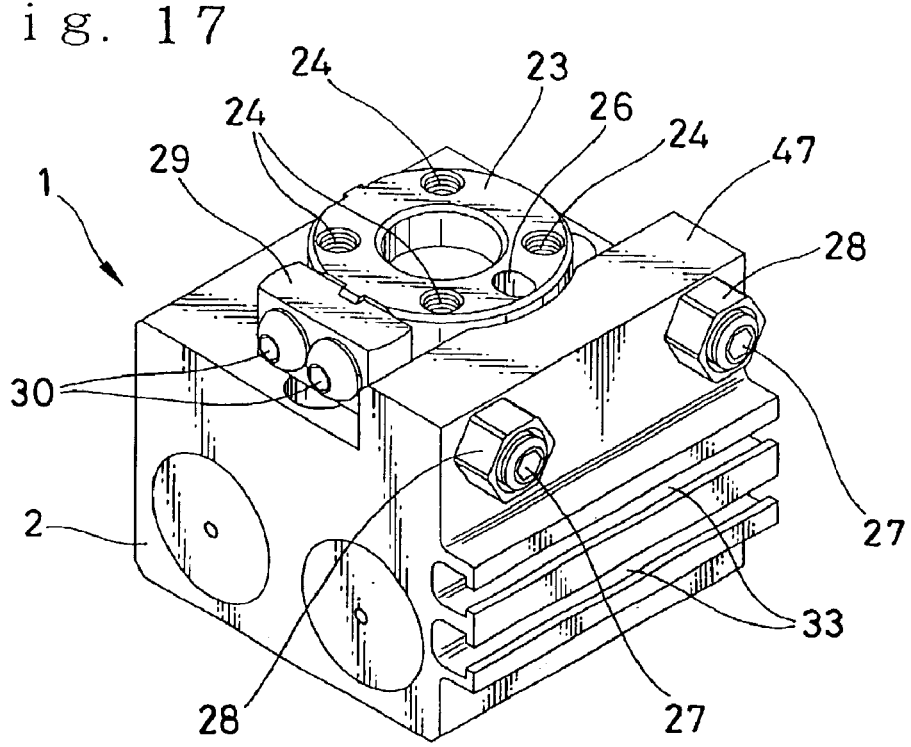
FIG. 17 is a perspective view of the actuator.
Figure 18:
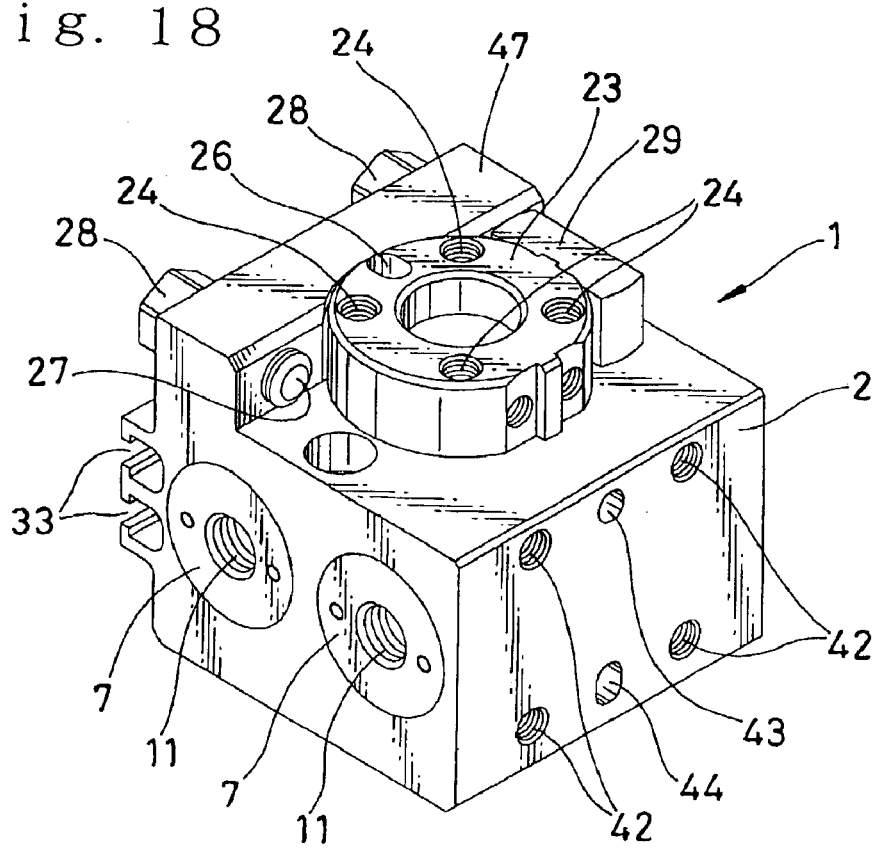
FIG. 18 is a perspective view of the actuator.
Figure 19:
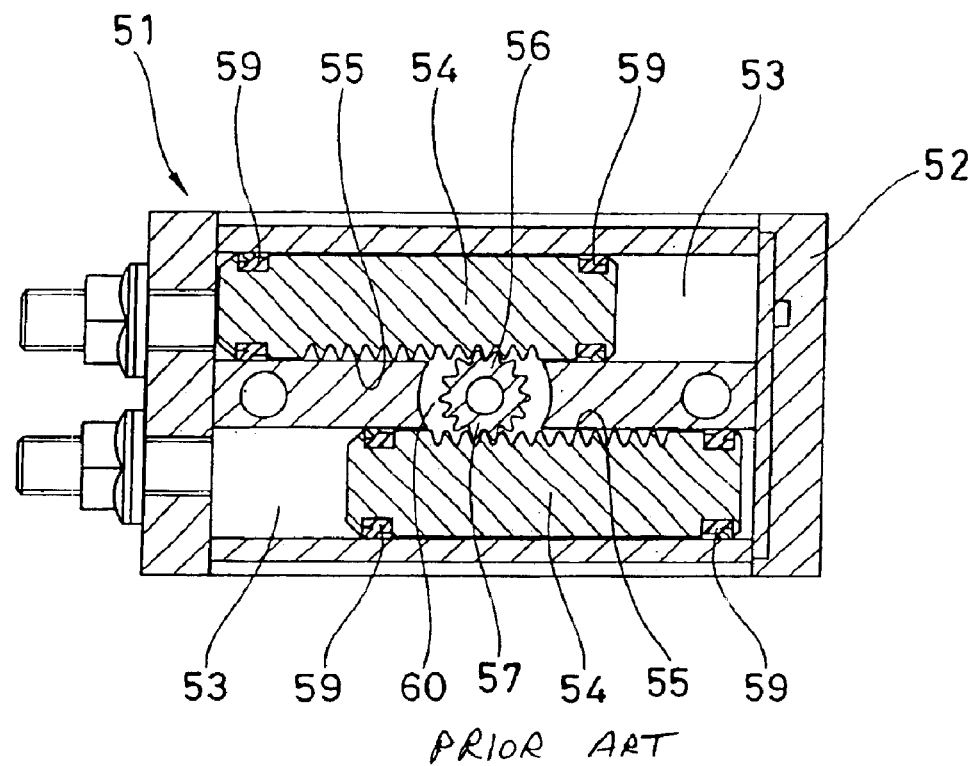
FIG. 19 is a horizontal cross sectional view of an oscillating actuator in accordance with conventional art.
Figure 20:
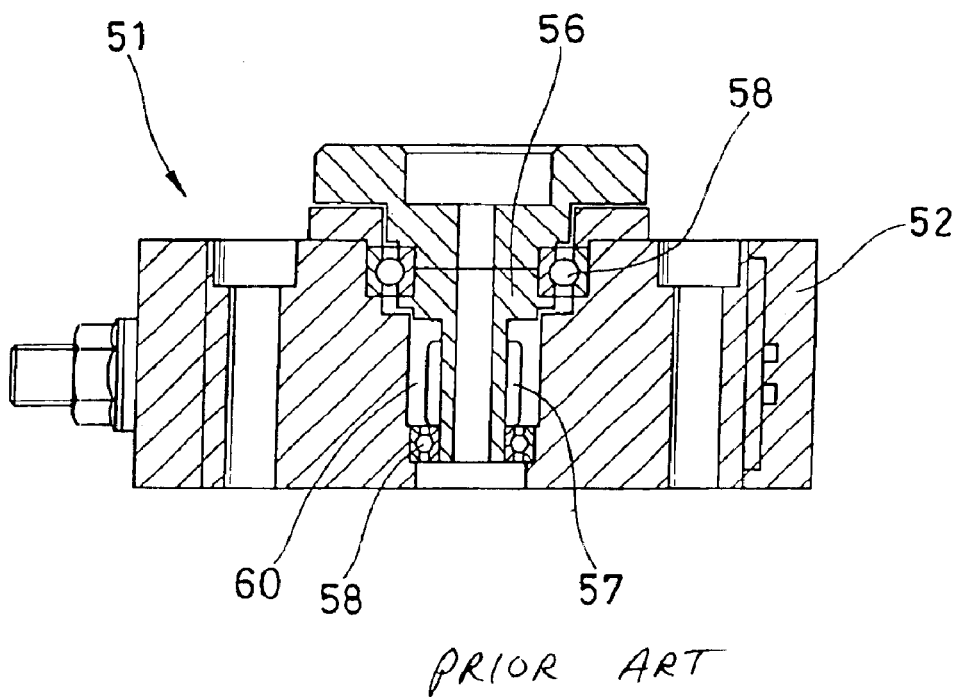
FIG. 20 is a vertical cross sectional view of the actuator.

Next, FIGS. 9 to 18 show a rack and pinion type oscillating actuator 1 in accordance with a second embodiment of the present invention. That is, FIG. 9 is a front view of the oscillating actuator 1 in accordance with the second embodiment, FIG. 10 is a right side view, FIG. 11 is a left side view, FIG. 12 is a back view, FIG. 13 is a plan view, FIG. 14 is a bottom view, FIG. 15 is a cross sectional view along a line C—C in FIG. 9, FIG. 16 is a cross sectional view along a line D—D in FIG. 10, and FIGS. 17 and 18 are perspective views.

The oscillating actuator 1 in accordance with the second embodiment is improved in the following points in comparison with the oscillating actuator in accordance with the first embodiment mentioned above.

That is, first, in the first embodiment mentioned above, as shown in FIG. 6, the structure is made such that the inner race 20 of the ball bearing 17 is clamped by the expanded portion 21 formed in the upper end of the output shaft 15 and the set screw 22 screwed into the lower end of the output shaft 15, however, in this second embodiment, as shown in FIG. 15, a flange nut 45 is used in place of the set screw 22, and the structure is made such that the inner race 20 of the ball bearing 17 is clamped by the expanded portion 21 formed in the upper end of the output shaft 15 and the flange nut 45 screwed into the lower end of the output shaft 15. Accordingly, in accordance with the structure on the basis of the second embodiment, since a through hole (shown by a dotted line in the drawing) 46 open to the lower end surface of the output shaft 15 can be provided in the output shaft 15, this through hole 46 can be utilized as a passage for supplying the compressed air, a negative pressure, an electricity or the like to the tool (not shown) mounted to the table 23.

Second, in the first embodiment mentioned above, as shown in FIG. 4, the structure is made such that the flat-shaped end surface of the stopper member 29 is brought into contact with the spherical leading end portion of the adjusting bolt 27, in the oscillation ends of the table 23, however, in the second embodiment, as shown in FIG. 13, the structure is made such that an arc-shaped (a curved) end surface of the stopper member 29 is brought into contact with the flat leading end portion of the adjusting bolt 27. Accordingly, in accordance with the structure on the basis of this second embodiment, since a fastening bolt with hexagonal hole available in a market can be used as the adjusting bolt 27 having the flat-shaped leading end portion, it is easy to obtain bolt parts and it is possible to reduce a parts cost.

Third, in the first embodiment mentioned above, as shown in FIG. 2, the structure is made such that the adjusting bolt 27 is screwed into the body 2 from the surface of the body 2 in which the pipe port 11 is provided, however, in the second embodiment, as shown in FIGS. 9 and 10, the structure is made such that a mounting table 47 for the adjusting bolt 27 is extended to an upper side of the surface of the body 2 in which the sensor mounting groove 33 is provided, and the adjusting bolt 27 is screwed into the mounting table 47 from the surface of the body 2 in which the sensor mounting groove 33 is provided. Therefore, in accordance with the structure on the basis of the second embodiment, it is possible to prevent a pipe joint (not shown) connected to the pipe port 11 from being an obstacle in the way of the operation, at a time of moving the adjusting screw 27 forward or backward, and loosening or fastening the nut member 28 at the actual working time.

Fourth, in the first embodiment mentioned above, in the case that the adjusting bolt 27 is not screwed into the body 2, since the table 23 and the stopper member 29 freely rotate as shown in FIG. 4, the oscillation is stopped by the rack member 4 being brought into contact with the end member 7 in the inner portion of the body 2. Therefore, in accordance with this structure, since the impact force at the contact time is applied to the rack 5 and the pinion 16, there is a risk that these members are broken. On the contrary, in the second embodiment, as shown in FIG. 13, since the stopper member 29 is brought into contact with the mounting table 47 of the adjusting bolt 27 and stops even in the case that the adjusting bolt 27 is not screwed into the body 2, the impact force at the contact time is not applied to the rack 5 and the pinion 16. Accordingly, it is possible to previously prevent the rack 5 and the pinion 16 from being broken due to the impact force.

The other structures and operations and effects of the oscillating actuator 1 in accordance with the second embodiment are the same as those of the first embodiment mentioned above. Accordingly, the same reference numerals are attached to the respective drawings and a description thereof will be omitted.

The present invention achieves the following effects.

That is, first, in the oscillating actuator in accordance with the first aspect of the present invention provided with the structure mentioned above, since the rack engaging with the pinion of the output shaft is formed on the outer surface of the rack member, and the seal member sealing the compressed air in the pressure chamber is arranged in the inner portion of the rack member, it is not necessary to arrange the rack and the seal member in series in the axial direction, whereby it is possible to reduce the axial length of the rack member in comparison with the conventional one. Accordingly, it is possible to reduce the axial length of the body, and it is possible to make the whole of the actuator in small size in the same direction. Further, since the closed-end cylindrical hole is formed in the rack member and the rack member is formed in the hollow shape, it is possible to reduce the weight of the rack member. Therefore, it is possible to provide the oscillating actuator having the small size and the small weight.

Further, since the sliding surface of the seal member does not overlap with the sliding surface of the rack member in accordance with the structure mentioned above, it is possible to previously prevent the seal member from being affected by the sliding abrasion powder generated by the sliding of the rack member, whereby it is possible to improve the service life of the seal member.

In addition, in the oscillating actuator in accordance with the second embodiment provided with the structure mentioned above, since the gap in the diametrical direction between the piston and the inner surface of the closed-end cylindrical hole is formed larger than the gap in the diametrical direction between the rack member and the inner surface of the sliding hole, the piston and the inner surface of the closed-end cylindrical hole are not in contact with each other, and the sliding abrasion powder are not generated, whereby it is possible to maintain the lubricating fluid within the closed-end cylindrical hole in good state. Further, it is possible to inhibit the reaction force generated when the rack transmits the force to the pinion from being applied to the piston, and it is possible to inhibit the rack member from galling between the inner surface of the sliding hole and the piston. Accordingly, it is possible to improve the service life of the seal member in accordance with the matters mentioned above, and it is possible to smoothly operate the oscillating actuator.

What is claimed is:

1. A rack and pinion oscillating actuator comprising a pair of mutually parallel sliding holes formed in a body, the sliding holes being open at only one end, rack members having racks slidably fitted in the pair of sliding holes, respectively, an output shaft, having a pinion engaged with the racks, being rotatably supported by bearings arranged in the body, and the output shaft being rotated by reciprocation of the rack members on a basis of a supplying and discharging of compressed air, a pair of end members closing a respective one of the only end openings of each of the sliding holes arranged in the body, a fixed piston extending in an axial direction from a respective one of the end members internally within a respective one of the sliding holes and internally within a respective one of the rack members to a sealed, closed end cylindrical hole provided in the respective one of the rack members so as to relatively displace the rack members in an axial direction with respect to the sliding holes, and a fluid passage having one end portion communicating with a pipe port provided in each end member and another portion communicating through a flow passage of the piston with said sealed, closed end cylindrical hole provided in the respective one of the rack members so that upon alternate introduction of compressed air to the rack members through the pistons from the end members, the output shaft rotates in opposite directions.

2. The rack and pinion oscillating actuator as claimed in claim 1, wherein a gap in a diametrical direction between an outer surface of the piston and an inner surface of the closed end cylindrical hole of the rack member is larger than a gap in the diametrical direction between an outer surface of the rack member and an inner surface of the sliding hole.

* * * * *